(12) United States Patent
Okazaki et al.

(10) Patent No.: US 7,210,829 B2
(45) Date of Patent: May 1, 2007

(54) VEHICLE INTERIOR ILLUMINATION STRUCTURE

(75) Inventors: Yasuaki Okazaki, Fuchu-cho (JP); Hitoshi Ochimizu, Fuchu-cho (JP); Masaya Hiramatsu, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 11/200,240

(22) Filed: Aug. 10, 2005

(65) Prior Publication Data
US 2006/0034092 A1 Feb. 16, 2006

(30) Foreign Application Priority Data

| Aug. 13, 2004 | (JP) | ............................. 2004-235930 |
| Aug. 13, 2004 | (JP) | ............................. 2004-235931 |
| Jun. 2, 2005 | (JP) | ............................. 2005-162751 |

(51) Int. Cl.
*B60Q 1/00* (2006.01)

(52) U.S. Cl. ...................... 362/489; 362/503; 362/488; 362/30

(58) Field of Classification Search ................ 362/489, 362/494, 23, 30, 335, 482, 70, 471, 488, 362/503; 280/752
See application file for complete search history.

(56) References Cited

U.S. PATENT DOCUMENTS

| D182,011 S | * | 1/1958 | Wilfert | ........................ D12/92 |
| 2,855,066 A | * | 10/1958 | Nallinger | ...................... 180/90 |
| 2,966,952 A | * | 1/1961 | Wilfert | ........................ 362/489 |
| 3,654,013 A | * | 4/1972 | Willsie et al. | ............... 156/212 |
| 5,207,492 A | * | 5/1993 | Roberts | ........................ 362/30 |
| 5,537,300 A | * | 7/1996 | Kraines et al. | ................ 362/86 |
| 6,621,688 B1 | * | 9/2003 | Burdick | ........................ 361/627 |

FOREIGN PATENT DOCUMENTS

JP 2004-90897 3/2004

* cited by examiner

*Primary Examiner*—Renee Luebke
*Assistant Examiner*—Zahra I. Bennett
(74) *Attorney, Agent, or Firm*—Nixon Peabody LLP; Donald R. Studebaker

(57) ABSTRACT

Disclosed is a vehicle interior illumination structure comprising, in combination, an instrument panel 10 installed in a front interior area of a vehicle, and a light-guiding illumination member 2 disposed in the instrument panel. The instrument panel 10 is formed with a step portion S laterally extending at a height approximately equal to or above that of a mounting portion of a shaft of a steering wheel 35 to the instrument panel. The step portion S is defined in such a manner that a step upper surface 11*f* located on the upper side of the step portion and a step lower surface 12*f* located on the lower side of the step portion are formed in the instrument panel 10, and the step upper surface 11*f* has a rear edge 11*p* protruding in the rearward direction of the vehicle relative to a front edge 12*p* of the step lower surface 12*f*. The illumination member 2 is arranged to extend laterally at a position which is adjacent to the front edge 12*p* of the step lower surface 12*f* and capable of preventing illumination light of the illumination member 2 from directly coming within the field of view of a driver sitting in a front seat in the vehicle interior. The vehicle interior illumination structure of the present invention can prevent illumination light of the illumination member from obstructing the driver's view.

7 Claims, 10 Drawing Sheets

VEHICLE INTERIOR ILLUMINATION STRUCTURE

TECHNICAL FIELD

The present invention relates to a structure for illuminating the interior of a vehicle, such as an automobile, and more particularly to a vehicle interior illumination structure comprising, in combination, an instrument panel installed in a front interior area of a vehicle and a light-guiding illumination member disposed in the instrument panel.

BACKGROUND ART

Late years, with a view to providing sophisticated design of a vehicle interior and creating a tranquil atmosphere during illumination, various efforts have been made to adopt an indirect illumination technique to a system for illuminating the interior of a vehicle, such as an automobile, during the night etc., in place of a commonly used conventional technique, so-called "direct illumination". Differently from the direct illumination technique designed to illuminate a target region by direct light from an illumination member capable of emitting illumination light, the indirect illumination technique is designed to reflect illumination light from an illumination member by a wall surface adjacent thereto and illuminate a target region using the reflected light. Thus, the indirect illumination technique can eliminate the disadvantage in the direct illumination technique, such as excessive brightness in the entire vehicle interior or in the illuminated region and the vicinity thereof, so as to create more tranquil/relaxed atmosphere.

As the system for illuminating the interior of a vehicle, such as an automobile, there has been known one type designed to incorporate an illumination member having a light-guiding performance (hereinafter referred to as "light-guiding illumination member") in a vehicle interior component, and allow light of a light source provided inside or outside the illumination member to be emitted from the illumination member so as to illuminate the vehicle interior by the emitted light.

For example, the following Patent Publication 1 discloses an illumination member comprising a light guide plate incorporated inside a light-transparent panel, and a light source (e.g. light-emitting diode) disposed on the side of the light guide plate, wherein light from the light source enters from a side surface into the inside of the light guide plate and then exits from a front surface of the light guide plate.

The Patent Publication 1 (Japanese Patent Laid-Open Publication No. 2004-90897) discloses an illumination system for a vehicle, in which the above illumination member is disposed in a center console box, an interior ceiling above a rearview mirror, an instrument panel or a door panel.

Generally, an instrument panel installed in a front interior area of an automobile is provided with various components, such a glove box, and various manual operation elements, such as switches and a wind-direction adjusting lever for an air-conditioning system. Therefore, in dark circumstances, such as the nighttime, it is required to allow an occupant, such as a driver, to recognize the shape and position of the instrument panel so as to ensure usability or user-friendliness in using or manually operating such components and manual operation elements.

In the conventional illumination system where the illumination member is incorporated in an instrument panel to ensure the above user-friendliness, illumination light from the illumination member is liable to directly come within the field of view of a driver sitting in a front seat in a vehicle interior and obstruct the driver's view. The illumination light directly coming within the driver's field of view will cause difficulty in driving during the illumination at night etc., and induce an uncomfortable or disturbed feeling in the driver.

Even if an indirect illumination technique is simply applied to the illumination system associated with an instrument panel, illumination light from an illumination member is likely to directly come within the field of view of a driver sitting in a front seat in a vehicle interior and obstruct the driver's view, depending on the position of the illumination member and the direction of the illumination light.

SUMMARY OF THE INVENTION

In view of the above circumstances, it is a fundamental object of the present invention to provide a vehicle interior illumination structure comprising, in combination, an instrument panel installed in a front interior area of a vehicle, and a light-guiding illumination member disposed in the instrument panel, which is capable of preventing illumination light of the illumination member from directly coming within the field of view of a driver sitting in a front seat.

In order to achieve the above object, the present invention provides a vehicle interior illumination structure comprising, in combination, an instrument panel installed in a front interior area of a vehicle and located on the lower side of a front windshield glass, and a light-guiding illumination member disposed in the instrument panel, wherein the front interior area is defined by the front windshield glass and opposed side window glasses on the rearward side of the front windshield glass. In this vehicle interior illumination structure, the instrument panel is formed with a step portion extending laterally at a height approximately equal to or above that of a mounting portion of a steering wheel shaft to the instrument panel. The step portion is defined in such a manner that a step upper surface located on the upper side of the step portion and a step lower surface located on the lower side of the step portion are formed in the instrument panel, and the step upper surface has a rear edge protruding in the rearward direction of the vehicle relative to a front edge of the step lower surface. Further, the illumination member is arranged to extend laterally at a position which is adjacent to the front edge of the step lower surface and capable of preventing illumination light of the illumination member from directly coming within the field of view of a driver sitting in a front seat in the vehicle interior.

As used in the specification, the term "driver" means an occupant who has an average physique of American male adults and sits in a driver's seat in a seated posture conforming to a so-called "hip point" to be uniquely set to each vehicle.

As used in the specification, the term "lateral" or "laterally" means a width direction of the vehicle.

According to the vehicle interior illumination structure of the present invention, the instrument panel is formed with the step portion extending laterally to segment at least a part of the instrument panel into upper and lower portions, wherein the step upper surface or a surface of the upper portion is arranged to have a rear edge protruding in the rearward direction of the vehicle relative to a front edge of the step lower surface or a surface of the lower portion. Further, the illumination member extends laterally at a position adjacent to the front edge of the step lower surface. Thus, when it is necessary to illuminate the interior of a vehicle, for example, during driving through a tunnel or at night, illumination light from the illumination member can adequately illuminate the instrument panel so as to allow the driver to readily recognize the position of the instrument panel without excessively lightening the front exterior region.

In this case, the illumination light of the illumination member is emitted from an inner region of the step portion, and thereby the illumination effect is primarily induced by reflected light from the step lower surface and/or a folded region of the step upper surface. This makes it possible to achieve indirect illumination and thereby eliminate the disadvantage in direct illumination, such as excessive brightness in an illuminated region and the vicinity thereof so as to create more tranquil/relaxed atmosphere in the vehicle interior. In addition, the illumination member is arranged at a position capable of preventing illumination light of the illumination member from directly coming within the field of view of the driver sitting in the front seat in the vehicle interior. This makes it possible to more effectively prevent the illumination light from obstructing the driver's view. That is, an adverse affect on driving to be caused by illumination light getting into driver's eye can be more effectively avoided.

Other features and advantages of the present invention will be apparent from the accompanying drawings and from the detailed description.

DETAILED DESCRIPTIONS OF THE INVENTION

With reference to the accompanying drawings, an embodiment of the present invention will now be described in detail.

Figure 1:
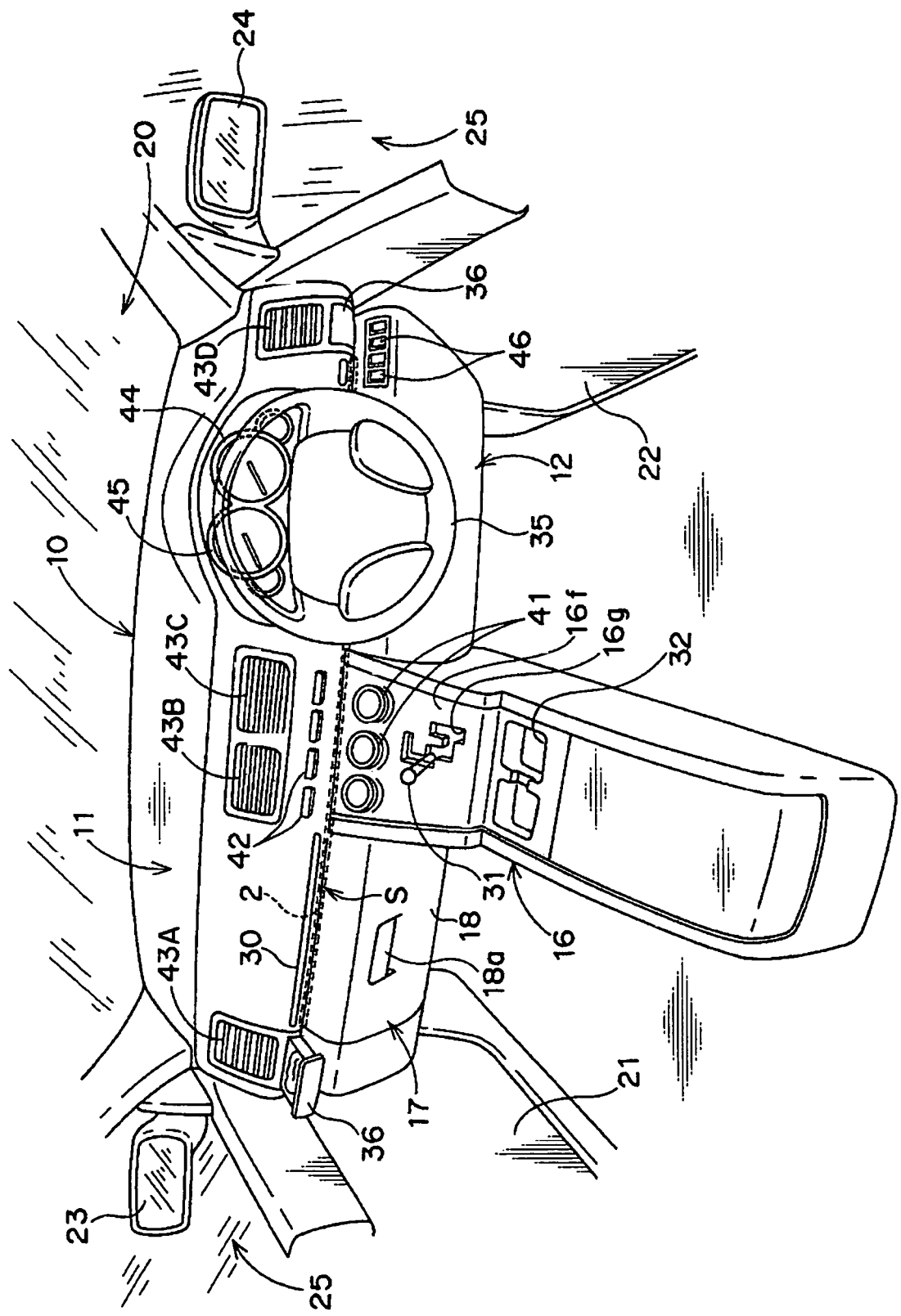
FIG. 1 is a schematic perspective view showing a front interior area of an automobile, which has a vehicle interior illumination structure according to a first embodiment of the present invention.

FIG. 1 is a schematic perspective view showing a front interior area of an automobile, which has a vehicle interior illumination structure according to a first embodiment of the present invention. As shown in FIG. 1, an instrument panel 10 is installed in the front interior area of the automobile to cover a lower region of the front interior area, and a front windshield glass 20 is disposed to extend upward from the vicinity of the front edge of the instrument panel 10 so as to cover an upper region of the front interior area. That is, the front edge of the instrument panel 10 is located adjacent to the lower edge of the front windshield glass 20. A pair of side window glasses 25 are disposed, respectively, at laterally opposite outer ends of the front windshield glass 20 and on the rearward side of the front windshield glass 20. A front or upper portion of the instrument panel 10 has opposite lateral edges located adjacent to lower edges of the corresponding side window glasses 25.

The instrument panel 10 includes a center console unit 16 which extends from an approximately laterally central region thereof in a vertical and rearward direction of the vehicle. This center console unit 16 has a front inclined portion 16f formed with a lever guide groove 16g for allowing a gearshift lever 31 to penetrate therethrough, as described in detail later with reference to FIG. 3. The center console unit 16 also includes a cup holder 32 on the lower and rearward side of the lever guide groove 16g, and three manual setting dials 41 (41A, 41B, 41C: see FIG. 3) for an air-conditioning system, on the upper and frontward side of the lever guide groove 16g. Further, various types of manual operation buttons 42 (42A, 42B, 42C, 42D: see FIG. 3) for an audio system are disposed in a region of the instrument panel 10 on the upper side of the air-conditioning manual setting dials 41, and two conditioned-air outlet ports 43B, 43C are formed in a region of the instrument panel 10 on the upper side of the manual operation buttons 42.

A right zone of the instrument panel 10 relative to the center console unit 16 (when seeing from the rear to the front of the vehicle) is located in front of a driver's seat (not shown). Various meters, such as a vehicle speed meter 44 and an engine speed meter 45, are arranged in a region of the instrument panel 10 facing a steering wheel 35, and a conditioned-air outlet port 43D is formed in a region of the instrument panel 10 on the right side of the meters. Further, various switches 46, such as a fog lamp switch, are disposed in a region of the instrument panel 10 on the lower side of the conditioned-air outlet port 43D.

A left zone of the instrument panel 10 relative to the center console unit 16 (when seeing from the rear to the front of the vehicle) is located in front of a front passenger seat (not shown), and formed with a glove box 17 serving as a small storage compartment. A conditioned-air outlet port 43A is formed in a region of the instrument panel 10 on the upper left side of the glove box 17. The instrument panel 10 also has a pair of cup holders 36 provided in a slidable manner, just below the conditioned-air outlet port 43A located at the left end of the vehicle interior, and the conditioned-air outlet port 43D located at the right end of the vehicle interior, respectively.

A pair of door mirrors 23, 24 each serving as a side mirror for visually checking primarily the lateral rearward of the vehicle are provided, respectively, at the front ends of right and left front doors 21, 22.

In the following description, each of the air-conditioning manual setting dials 41 (41A, 41B, 41C), each of the audio manual operation buttons 42 (42A, 42B, 42C, 42D) and each of the conditioned-air outlet ports 43 (43A, 43B, 43C, 43D) will be occasionally described, respectively, as "air-conditioning manual setting dial(s) 41", "audio manual operation button(s) 42" and "conditioned-air outlet port(s) 43" simplistically by removing the alphabetical code, unless necessary to distinctively describe a specific one of them.

In the first embodiment, the instrument panel 10 preferably comprises an upper unit 11 constituting an upper portion thereof and a lower unit 12 constituting a lower portion thereof. While the center console unit 16 in this embodiment is assembled as a separate member into the instrument panel 10, the inclined portion 16f of the center console unit 16 in the assembled state belongs to the lower unit 12 of the instrument panel 10. It is understood that the center console unit 16 may be integrally formed with the lower unit 12 of the instrument panel 10.

The instrument panel 10 has a step portion S formed along the boundary between the upper unit 11 and the lower unit 12. That is, the step portion S extends laterally to segment the instrument panel 10 into upper and lower portions. An illumination member 2 having a light-guiding performance (hereinafter referred to as "light-guiding illumination member") is disposed in the step portion S. Preferably, the step portion S and the illumination member 2 are provided to extend over the entire width of the instrument panel 10 while getting around a mounting portion of a shaft of the steering wheel 35. The step portion S is formed at a height approximately equal to or above that of the mounting portion of the shaft of the steering wheel 35 to the instrument panel 10 to create a sophisticated luxury design. In particular, the step portion S may be located above a specific position adjacent to the lower edge of the laterally right, left or central conditioned-air outlet port (a specific position below the lower edge by a given distance (e.g. 20 cm)) to provide more enhanced design.

The step portion S and the illumination member 2 will be described in more detail below.

Figure 2:
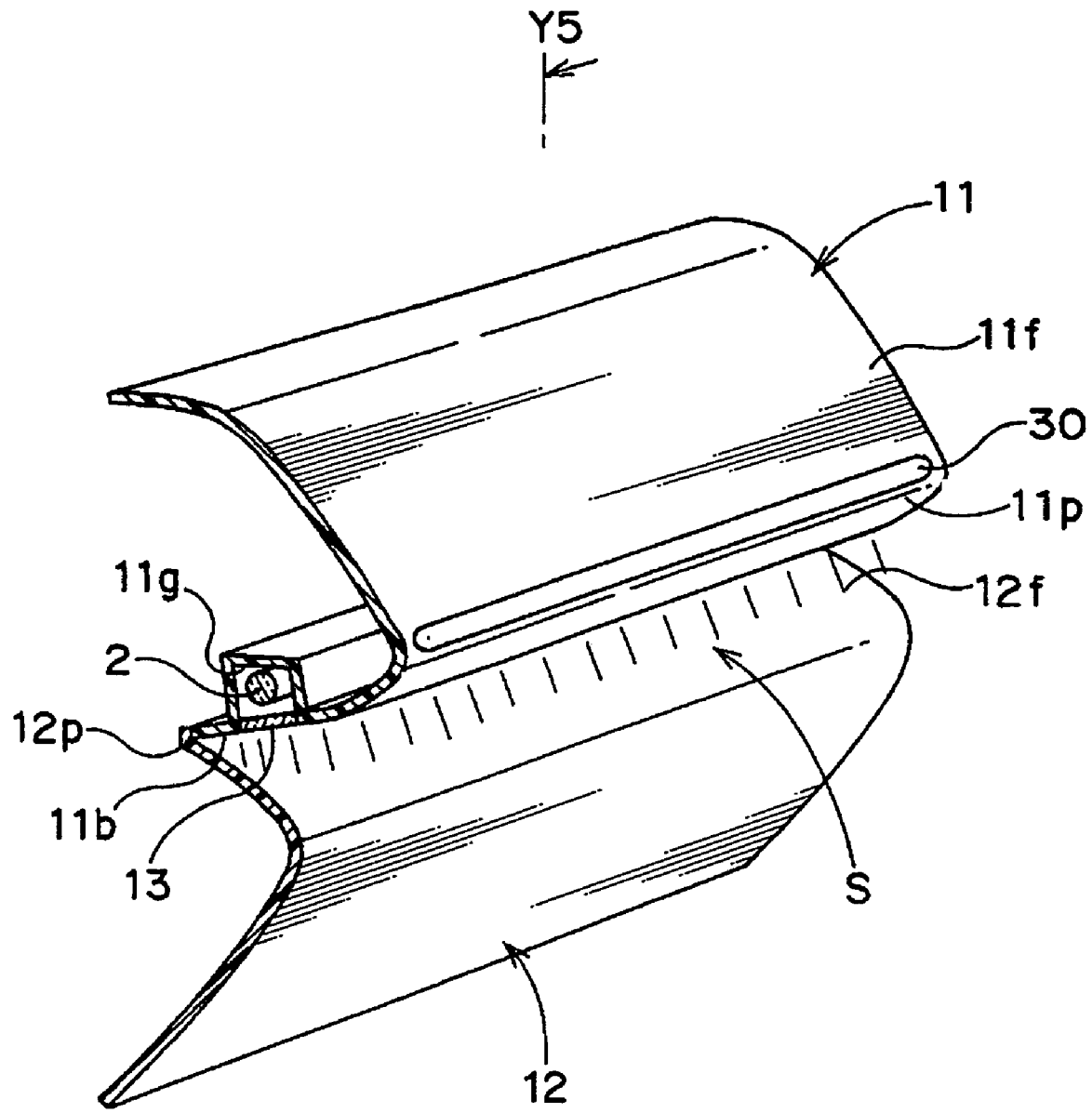
FIG. 2 is a perspective view showing the fundamental structure of a step portion formed in an instrument panel installed in the front interior area of the automobile.
Figure 3:
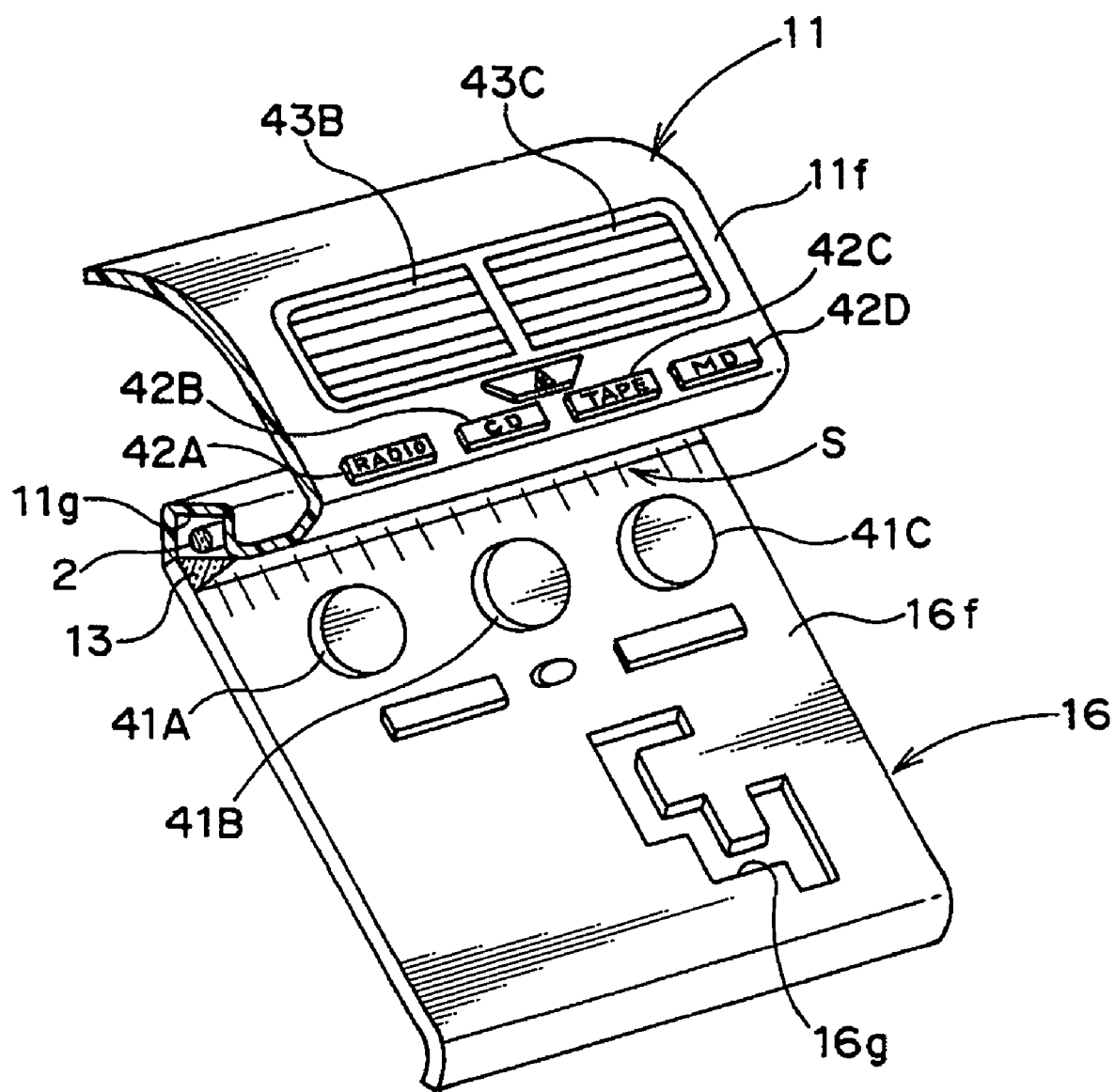
FIG. 3 is a perspective view showing the structure of the step portion on the upper side of a center console unit of the instrument panel.
Figure 4:
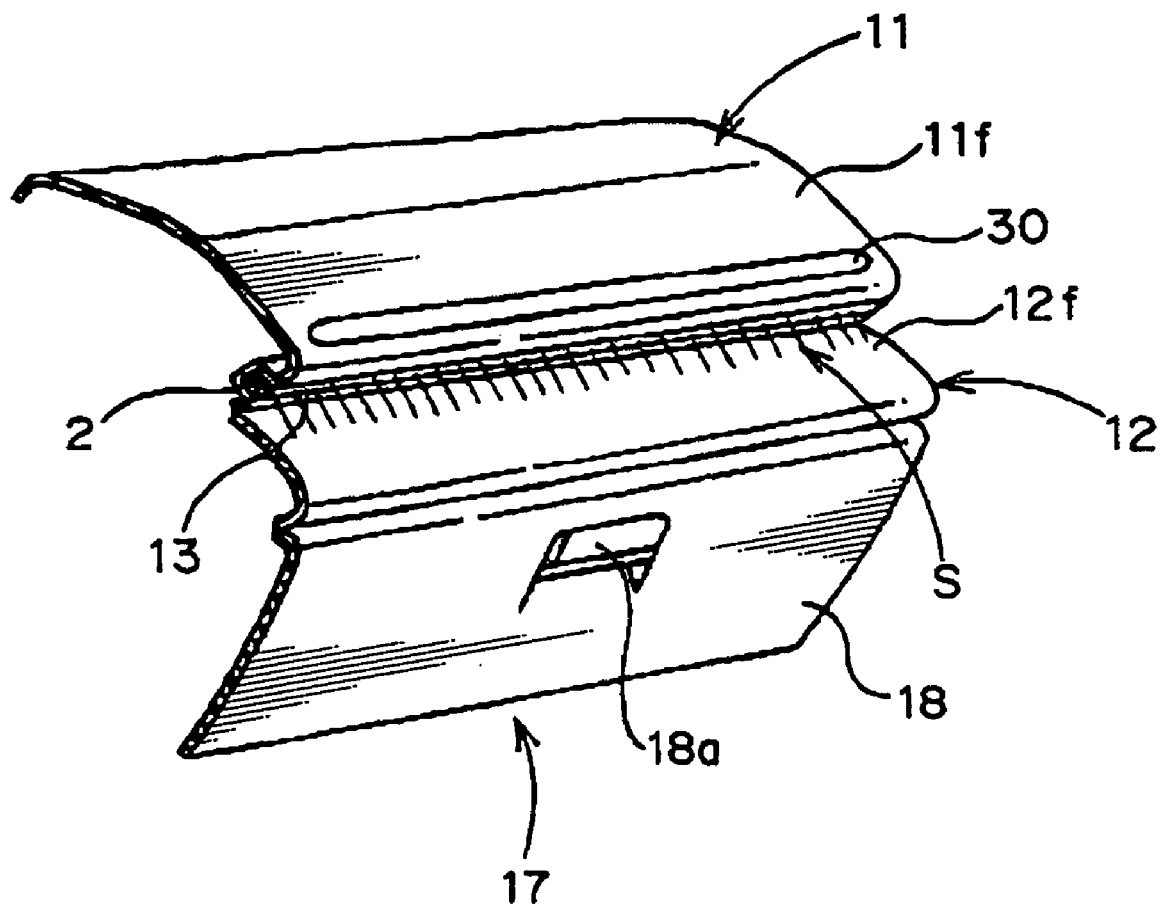
FIG. 4 is a perspective view showing the structure of the step portion on the upper side of a glove box of the instrument panel.

FIG. 2 is a perspective view showing the fundamental structure of the step portion S of the instrument panel 10, and FIGS. 3 and 4 are perspective views showing the structure of the step portion S on the upper side of the center console unit 16 and the structure of the step portion S on the upper side of the glove box, respectively.

As shown in FIG. 2, the instrument panel 10 has a surface 11f of the upper unit 11 located on the upper side of the step portion S (step upper surface 11f), and a surface 12f of the lower unit 12 located on the lower side of the step portion S (step lower surface 12f). The step upper surface 11f is folded obliquely downward in the frontward direction of the vehicle to form a folded region 11b, and the front edge of the folded region 11b (or the lower edge of the step upper surface 11f) is engaged with the front edge of the step lower surface 12f (or the upper edge of the step lower surface 12f) to define the step portion S. That is, the step upper surface 11f has a rear edge 11p protruding in the rearward direction of the vehicle relative to the front edge 12p of the step lower surface 12f.

Figure 6:
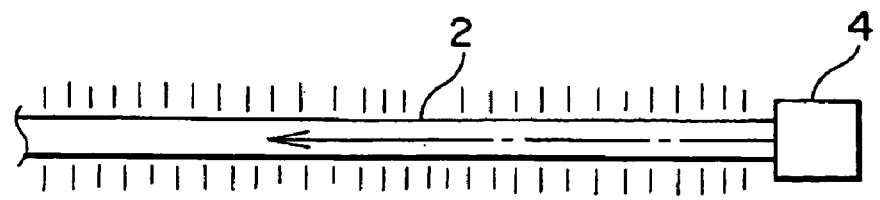
FIG. 6 is a schematic explanatory diagram of an illumination member disposed in the step portion of the instrument panel.

The illumination member 2 is disposed in the innermost region of the step portion S or in the vicinity of the front edge 12p of the step lower surface 12f, to extend laterally. As schematically shown in FIG. 6, the illumination member 2 is made of a material having a light-guiding performance, such as acrylic resin or polycarbonate resin, and formed in an elongated rod or column shape. A light source 4 (e.g. a light-emitting diode, a halogen lamp or an incandescent lamp) is disposed at one lateral end of the illumination member 2. The light source 4 is designed to be supplied with an electric power in conjunction with the activation of side or head lamps (not shown) of the vehicle. The above material has flexibility (resiliency), and thereby the illumination member 2 can be set along a curved region having a certain curvature without any problem.

In a conventional manner, light from the light source 4 enters from one end surface to the inside of the illumination member 2, and exits from a front surface of the illumination member 2 to illuminate the surrounding.

Instead of providing the separate light source 2 as above, a line-shaped or dot-shaped light source may be disposed within the illumination member to illuminate the surrounding.

Figure 5:
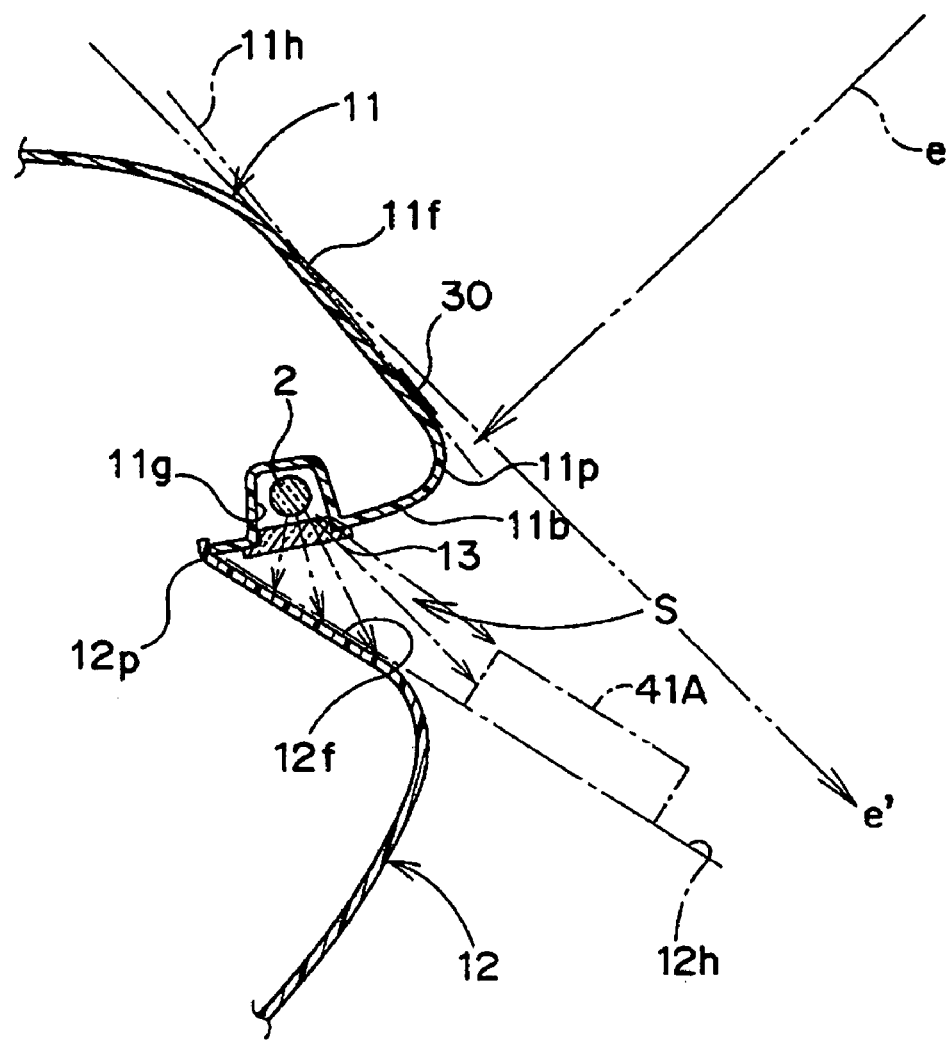
FIG. 5 is an explanatory sectional view of the instrument panel, taken along the line Y5—Y5 in FIG. 2.

As shown in FIG. 5, a groove portion 11g having an approximately ⊓shape in section and an opening on the lower side thereof is formed adjacent to the front edge of folded region 11b of the upper unit 11 to extend laterally, and the illumination member 2 is contained in the groove portion 11g. The opening of the groove portion 11g containing the illumination member 2 is located to face the step lower surface 12f, and closed by a cover member 13 made of transparent or semi-translucent light-transmittable glass or resin to protect the illumination member 2 contained therein.

As above, the groove portion 11g containing the illumination member 2 has the opening facing the step lower surface 12f. Thus, light emitted from the front surface of the illumination member 2 transmits through the cover member 13 as indicated by the one-dot-chain-line arrows in FIG. 5 and falls on the step lower surface 12f. Then, resulting reflected light is used for illumination. That is, the step lower surface 12f is illuminated by means of the so-called indirect illumination.

Thus, when it is necessary to illuminate the vehicle interior, for example, during driving through a tunnel or at night, the instrument panel 10 can be illuminated by illumination light from the illumination member 2, so as to allow a driver to recognize the position of the instrument panel 10 without excessively illuminating the front interior area of the vehicle.

In this case, when a driver sitting in a front seat (driver's seat) (not shown), particularly at a position generally considered to be advantageous to facilitating driving, visually recognizes the above illuminated region in this sitting posture, the illumination member 2 is intercepted or blocked by the step upper surface 11f, and thereby the illumination member 2 itself never comes within the driver's field of view, as seen in the driver's line of sight indicated by the two-dot-chain-line arrow "e" in FIG. 5. In addition, the step upper surface 11f can logically prevent the illumination member 2 from being reflected on the front windshield glass 20 and the side wind glasses 25 to eliminate adverse affects on occupant's driving. Each dimension and the positional relationship of the elements of the vehicle interior illumination structure are arranged such that illumination light directly emitted from the illumination member 2 is almost blocked by the step upper surface 11f to substantially prevent the illumination light from directly coming within the driver's field of view. While FIG. 5 shows the step portion S in a region of the instrument panel 20 in front of the front passenger seat, the step portion S adjacent to the center console unit 16 is designed in the same manner as that described above.

In the vehicle interior illumination structure according to the first embodiment, the illumination is performed by means of indirect illumination. This makes it possible to eliminate the disadvantage in direct illumination, such as excessive brightness in an illuminated region and the vicinity thereof, so as to create more tranquil/relaxed atmosphere in the vehicle interior. In addition, the vehicle interior illumination structure is designed to prevent illumination light of the illumination member 2 from directly coming within the field of view of a driver sitting in the front seat in the vehicle interior, and prevent an image of the illumination member 2 from coming within the driver's field of view through the front windshield glass 20 and the side wind glasses 25. This makes it possible to more reliably prevent the illumination light from obstructing the view of the driver sitting in the front seat. That is, the vehicle interior illumination structure can more reliably suppress an adverse affect on driving to be caused by illumination light getting into driver's eye, and can reduce an uncomfortable or disturbed feeling during driving in situations requiring to illuminate the vehicle interior, such as driving through a tunnel or at night.

Further, the illumination member 2 for the above indirect illumination is provided to extend over the approximately entire width of the instrument panel 10. Thus, during illumination at night or the like, the vehicle interior illumination structure can give an impression as if a region of the instrument panel 10 on the upper side of the illuminated region is almost entirely floating to provide enhanced interior design and create a sophisticated luxury atmosphere.

While the step portion S and the illumination member 2 in the first embodiment are provided to extend over the approximately entire width of the instrument panel 10, the step portion S and the illumination member 2 may be provided only in a specific lateral range of the instrument panel 10 according to need.

Further, while the vehicle interior illumination structure according to the first embodiment is designed to reflect illumination light from the illumination member 2 disposed at the inner region of the step portion S, by the step lower surface 12f, it may be designed to reflect the illumination light by the folded region 11b of the step upper surface 11f, in place of or in addition to the step lower surface 12f.

In the first embodiment, the upper unit 11 of the instrument panel 10 including the step upper surface 11f has a relatively dark tone, such as black, gray, dark blue, brown or a color tone based thereon. Preferably, the lower unit 12 including the step lower surface 12f also has a relatively dark tone.

As above, at least the upper unit 11 of the instrument panel 10 has the relatively dark tone. This makes it possible to prevent the upper unit 11 itself of the instrument panel 11 including the step upper surface 11f from being reflected on the front windshield glass 20, for example, even during driving through a tunnel or at night, and keep the reflection from obstructing the driver's view.

However, if the upper unit 11 of the instrument panel 10, particularly the step upper surface 11f, has the dark tone, and a manual operation element, such as the manual operation buttons 42 (42A to 42D) for an audio system as shown in FIG. 3, is arranged on the step upper surface 11f without any measures, a driver is likely to misjudge a distance to the step upper surface 11f when operating the manual operation button 42 due to indistinctness in a region of the step upper surface 11f adjacent to the step portion S, and cause driver's discomfort, for example, due to a finger sprain or finger-sprain-like accident.

This undesirable phenomenon becomes increasingly prominent when the step upper surface 11f and the step lower surface 12f have inclined zones 11h, 12h, respectively, in the vicinity of the step portion S (see FIG. 5), and each of the inclined zones 11h, 12h has a different angle of inclination, particularly the step upper surface 11f is inclined closer to a vertical line than the step lower surface 12f. This condition makes it difficult for the driver to recognize a distance to the region of the step upper surface 11f adjacent to the step portion S.

From this point of view, in the first embodiment, in order to increase the degree of visibility of the manual operation buttons 42 (42A to 42D) disposed on the step upper surface 11f, against a background of the step upper surface 11f having the relatively dark tone, each logo (RADIO, CD, TAPE, MD) of the manual operation buttons 42 (42A to 42D) is designed to emit light therefrom, or is made of a luminescent material, as shown in FIG. 3. Instead of such a logo, a symbol mark may be attached to each of the manual operation buttons 42, and may be designed to emit light therefrom, or made of a luminescent material. Alternatively, each of the manual operation buttons 42 (42A to 42D) themselves may be designed to emit light therefrom, or covered by a luminescent material. Further, instead of emitting light or using a luminescent material, the logos, symbol marks or buttons may be colored by a lighter and more visible color than that of the step upper surface (e.g. red, white or yellow).

As above, the manual operation element (manual operation button 42) disposed on the step upper surface 11f has a higher degree of visibility that that of the step upper surface 11f. Thus, even though the upper unit 11 of the instrument panel 10 including the step upper surface 11f has the relatively dark tone, the manual operation buttons 42 (42A to 42D) can be visually recognized without any the problem to effectively avoid driver's discomfort, for example, due to a finger-sprain-like accident.

As mentioned above, particularly when the step upper surface 11f and the step lower surface 12f have the inclined zones 11h, 12h, respectively, in the vicinity of the step portion S (see FIG. 5), and each of the inclined zones 11h, 12h has a different angle of inclination, the driver has difficulty in recognizing a distance to the region of the step upper surface 11f adjacent to the step portion S. Even in this condition, the above manual operation buttons 42 can prevent the above problem from occurring.

In addition to the audio manual operation buttons 42, the manual operation element to be increased in the degree of visibility may include a wind-direction adjusting lever (not shown) provided at an opening portion of each of the conditioned-air outlet ports 43 formed in the step upper surface 11f or in the vicinity of the opening portion, and a slidable portion of each of the right and left cup holders 36 provided in the step upper surface 11f.

In the first embodiment, when the lower unit 12 of the instrument panel 10 also has a relatively dark tone, a manual operation element disposed on the step lower surface 12f of the lower unit 12, for example, the air-conditioning manual setting dials 41, a manual operation lever 18a of a lid portion 18 of the glove box 17 may be designed to increase the degree of visibility in the above manner so as to achieve the same effect as that in the manual operation element provided in the step upper surface 11f.

When the degree of visibility is increased in the manual operation elements disposed on both the step upper surface 11f and the step lower surface 12f, it is preferable that the manual operation element on the step upper surface 11f has a lower degree of visibility than that of the manual operation element on the step lower surface 12f.

While the manual operation element on the step upper surface 11f is liable to be reflected on the front windshield glass 20 because the step upper surface 11f is located closer to the front windshield glass 20 and more frontward than the step lower surface 12f, the above arrangement can suppress the reflection onto the front windshield glass 20.

It is also effective in increasing the degree of visibility in the step upper surface 11f to provide a given ornament on a region of the step upper surface 11f of the instrument panel 10 adjacent to the step portion S. In the first embodiment, as such an ornament, a line-shaped decorative sheet 30 having a relatively striking or distinctive color is attached on the vicinity of the rear edge 11p of the step upper surface 11f. This makes it easy to recognize the position of the step portion S so as to more effectively prevent the occurrence of the aforementioned problem, such as a finger-sprain-like accident.

Any other suitable type of ornament, such as a line-shaped label, may be provided on the region adjacent to the step portion S.

If the illumination member 2 disposed in the step portion S on the upper side of the lid portion 18 of the glove box located in opposed relation to the front passenger seat (not shown) is designed to perform direct illumination, and a driver visually checks the door mirror 23 on the outer side of the front passenger seat, a region illuminated by the illumination member 2 is more likely to get into driver's eye than the door mirror 23. In contrast, the vehicle interior illumination structure according to the first embodiment is designed to allow the illumination member 2 to perform indirect illumination, or to prevent illumination light of the illumination member 2 from directly coming within the field of view of the driver sitting in the front seat, so as to more effectively keep the illumination light from obstructing the driver's view. That is, an adverse affect on driving to be caused by illumination light getting into driver's eye when the driver visually checks the door mirror 23 can be more effectively avoided. While the above description has been made in connection with the left door mirror 23, the same effects can also be obtained when the driver visually checks the right door mirror 24 adjacent to the driver's seat.

All of the manual operation elements may be disposed only on the step lower surface 12f without arranging the manual operation buttons 42 (42A, 42B, 42C, 42D) etc., on the upper side of the center console unit. In this case, all of the manual operation elements can be illuminated by the illumination member 2, to effectively prevent the occurrence of a finger-sprain-like accident when the driver operates the manual operation buttons or the like.

In the first embodiment, the inclined portion 16f on the front side of the center console unit 16 is located below the step portion S, or corresponds to the step lower surface 12f in the central region of the instrument panel 10. As mentioned above, the air-conditioning manual setting dials 41 (41A, 41B, 41C) are disposed on the front upper region of the inclined portion 16f (or in the vicinity of the step portion S). The angle of inclination of the inclined portion 16f is set to be approximately equal to that of the inclined zone 12h (see FIG. 5). These air-conditioning manual setting dials 41 are illuminated by the illumination member 2 disposed in the step portion S adjacent to the front edge of the step lower surface (inclined portion) 16f.

Each of the manual setting dials 41 is formed in a circular disc shape having a given thickness (or in a cylindrical column shape having a given height) as particularly shown in FIG. 3, and the manual setting dial itself protrudes from the inclined portion 16f toward the vehicle interior by a given height, as seen in FIG. 5. Each height of the dials 41 protruding from the inclined portion 16f, and each detention, shape and the positional relation of other elements of the vehicle interior illumination structure are arranged to allow the setting dials 41 (41A, 41B, 41C) to be hidden by the step upper surface 11f when the driver sitting in the front seat visually recognizes the inclined portion 16f on the front side of the center console unit 16, the step portion S and the step upper surface 11f which are reflected on the front windshield glass 20. That is, the vehicle interior illumination structure is designed to allow the setting dials 41 (41A, 41B, 41C) to be hidden by the step upper surface 11f, with respect to the driver's line e' of sight reflected by the front windshield glass 20 (see FIG. 5).

Thus, the vehicle interior illumination structure is designed to prevent the setting dials 41 (41A, 41B, 41C), particularly the upper side-wall surfaces thereof illuminated by the illumination member 2 from being reflected on the front windshield glass 20 distinctively in a light tone, for example, even during driving through a tunnel or at night, and keep the reflection from obstructing the driver's view.

Preferably, the setting dials 41 (41A, 41B, 41C) in this embodiment have a lighter tone than that of the step upper surface 11f, for example, a metallic color. This allows the setting dials 41 to stand out against the indirect illumination by the illumination member 2 so as to ensure sufficiently high visibility. This arrangement may also be applied to the switches 46.

As mentioned above, a left region of the instrument panel 10 relative to the center console unit 16 is formed with the glove box 17 serving as a small storage compartment. As particularly shown in FIGS. 4 and 7, the glove box 17 comprises a pocket 17a located below the step portion S of the instrument panel 10 and concavedly curved in the frontward direction of the vehicle, and a lid portion 18 for covering the pocket 17a in an openable and closable manner.

Specifically, the glove box 17 is covered by the lid portion 18 serving as a rear wall thereof, and the lid portion 18 can be swingably moved to rotate the pocket 17a about the vicinity of the lower edge of the glove box 17, so that the pocket 17a is opened rearward in its entirety. The lid portion 18 has a manual operation lever 18a for allowing the lid portion 18 to be released from its closed state.

The pocket 17a is located at a position allowing an inner space of the pocket 17a to be illuminated by illumination light from the illumination member 2 disposed adjacent to the front edge of the step lower surface 12f.

Thus, illumination light from the illumination member 2 can be effectively used for illuminating the entire inner space of the pocket 17a of the glove box 17 to thereby achieve enhanced user-friendliness in opening the lid portion 18 of the glove box 17 to use the pocket 17a, without providing an additional illumination member.

Further, a detection switch 19 is disposed in the vicinity of an opening of the pocket 17a to detect whether the lid portion 18 is in an open position or in a closed position, and an intensity of illumination light from the illumination member 2 is adjusted according to a detection signal of the detection switch 19. Specifically, the vehicle interior illumination structure is designed to increase an intensity of illumination light from the illumination member 2 in the open position of the lid portion 18 as compared to that in the closed position of the lid portion 18.

For example, the illumination intensity may be adjusted by controlling an emission intensity of the light source 4. Preferably, the illumination member 2 to be disposed in a region of the instrument panel 10 corresponding to the glove box 17 is provided independently of the illumination member 2 to be disposed in the remaining region of the instrument panel 10.

As above, the vehicle interior illumination structure according to the first embodiment is designed to increase an intensity of illumination light from the illumination member 2 in the open position of the lid portion 18 for covering the pocket 17a in an openable and closable manner, as compared to that in the closed position of the lid portion 18. Thus, when the lid portion 18 is in the open position where it is necessary to illuminate the inner space of the pocket 17a, the inner space can be more sufficiently illuminated. When the lid portion 18 is in the closed position where it is unnecessary to illuminate the inner space of the pocket 17a, the illumination light is adjusted to have a relatively low intensity so as to more effectively prevent the illumination light from obstructing the view of the driver sitting in the front seat. That is, an adverse affect on driving to be caused by illumination light getting into driver's eye can be more effectively avoided.

If the illumination member 2 disposed in the step portion S on the upper side of the lid portion 18 of the glove box located in opposed relation to the front passenger seat (not shown) is designed to perform direct illumination, and a driver visually checks the door mirror 23 on the outer side of the front passenger seat, a region illuminated by the illumination member 2 is more likely to get into driver's eye than the door mirror 23. In contrast, the vehicle interior illumination structure according to the first embodiment is designed to allow the illumination member 2 to perform indirect illumination, or to prevent illumination light of the illumination member 2 from directly coming within the field of view of the driver sitting in the front seat, so as to more effectively keep the illumination light from obstructing the driver's view. That is, an adverse affect on driving to be caused by illumination light getting into driver's eye can be more effectively avoided. While the above description has been made in connection with the left door mirror 23, the same effects can also be obtained when the driver visually checks the right door mirror 24 adjacent to the driver's seat.

While the glove box 17 in the first embodiment is disposed below the step portion S of the instrument panel 10, such a glove box may be disposed above the step portion of the instrument panel.

A vehicle interior illumination structure according to a second embodiment of the present invention will be described below. In the following description, the same element or component as that in the first embodiment is defined by the same reference numeral or code, and its further description will be omitted.

Figure 8:
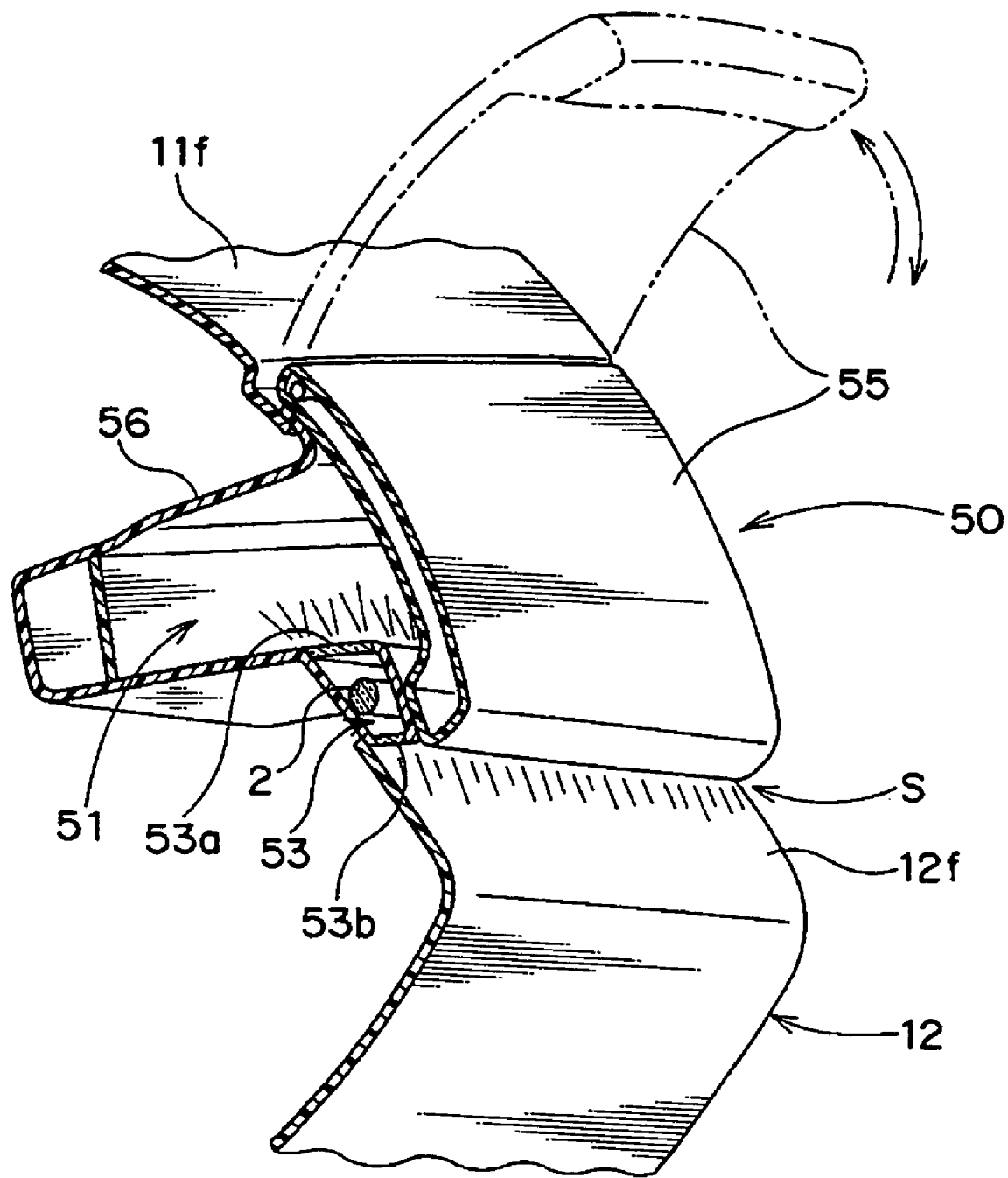
FIG. 8 is a perspective view showing a glove box in a vehicle interior illumination structure according to a second embodiment of the present invention.

As shown in FIG. 8, in the second embodiment, an instrument panel 10 is formed with a pocket 51 located above a step portion S thereof and concavedly curved in the frontward direction of a vehicle. A lid portion 55 is provided to cover the pocket 51 in an openable and closable manner so as to form a glove box 50 above the step portion S.

The pocket 51 is composed of a separate member 56 (pocket member), for example, made of synthetic resin and formed in an approximately ⊐ shape in section, and integrally joined to an step upper surface 11f of the instrument panel 10 at an upper edge and opposed right and left lateral edges thereof.

A groove portion 53 is formed below an opening of the pocket 51 to extend laterally, and an illumination member 2 is contained in the groove portion 53. The groove portion 53 has an approximately rectangular-shaped periphery in section, and the periphery has a top wall 53a and a bottom wall 53b which are made of transparent or semi-translucent light-transmittable glass or resin. Each dimension, shape and the positional relationship of the elements of the vehicle interior illumination structure are arranged to allow the top wall 53a of the groove portion 53 to face an inner space of the pocket 51 and allow the bottom wall 53b of the groove portion 53 to face a region of the step lower surface 12f adjacent to the step portion S.

As above, the groove portion 53 containing the illumination member 2 has the light-transmittable bottom wall 53b located to face the step lower surface 12f. Thus, light emitted from the front surface of the illumination member 2 transmits through the bottom wall 53b and falls on the step lower surface 12f. Then, resulting reflected light is used for illumination. That is, a region of the instrument panel 10 on the lower side of the glove box 50 is illuminated by means of the so-called indirect illumination.

The groove portion 53 also has the light-transmittable top wall 53a located to face the inner space of the pocket 51. Thus, light emitted from the front surface of the illumination member 2 transmits through the top wall 53a and illuminates the inner space of the pocket 51.

Thus, illumination light from the illumination member 2 can be effectively used for illuminating the inner space of the pocket 51 of the glove box 50 to provide enhanced user-friendliness in opening the lid portion 55 of the glove box 50 to use the pocket 51, without providing an additional illumination member.

The above effect can also be obtained even if the pocket 51 is always opened without the lid portion 55. Specifically, as long as the region on the lower side of the glove box 52 is illuminated by illumination light from the illumination member 2, a driver can readily recognize the position of the glove box 50 without illuminating the entire vehicle interior, for example, even during driving in situations requiring to illuminate the vehicle interior, such as driving through a tunnel or at night.

Figure 7:
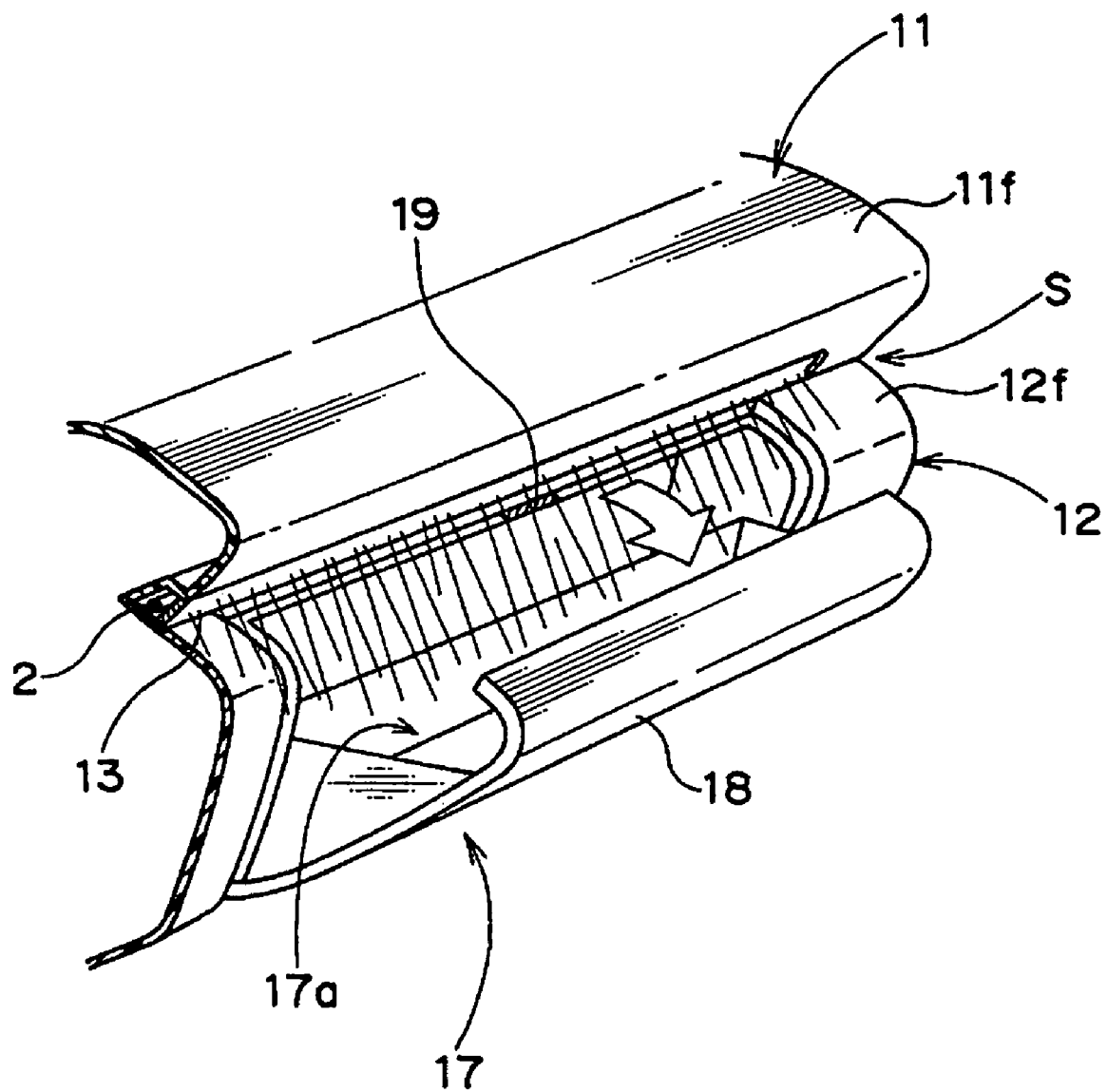
FIG. 7 is a perspective view showing the vehicle interior illumination structure in FIG. 4, wherein a lid portion of the glove box is opened.

Further, as with the first embodiment illustrated in FIGS. 4 and 7, a detection switch for detecting whether the lid portion 55 is in an open or closed position may be provided in the vehicle interior illumination structure according to the second embodiment, and an intensity of illumination light from the illumination member 2 may be adjusted according to a detection signal of the detection switch. Specifically, the vehicle interior illumination structure is designed to increase an intensity of illumination light from the illumination member 2 in the open position of the lid portion 55 as compared to that in the closed position of the lid portion 55, so as to obtain the same effect as that in the first embodiment.

Figure 9:
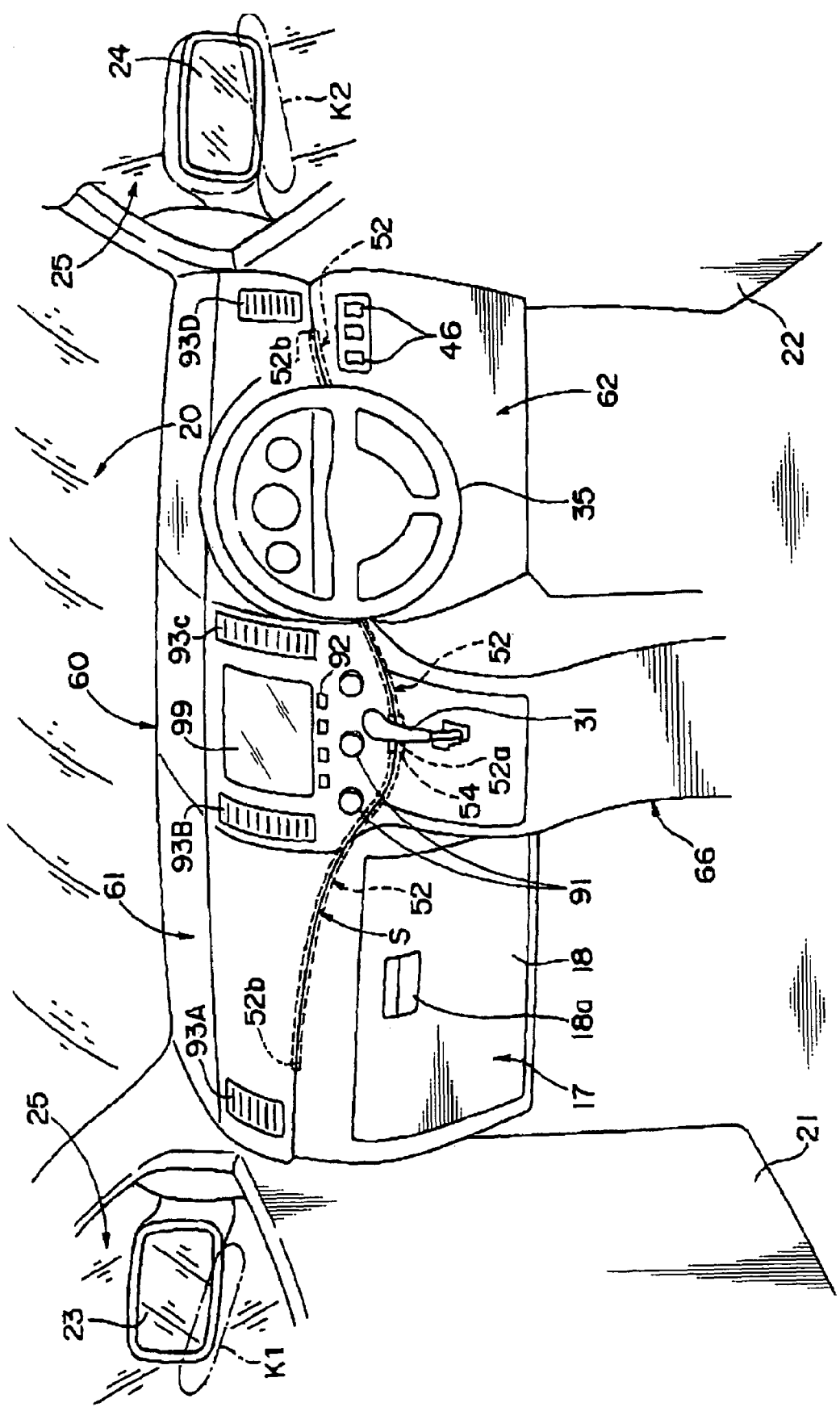
FIG. 9 is a schematic perspective view showing a front interior area of an automobile, which has a vehicle interior illumination structure according to a third embodiment of the present invention.

With reference to FIG. 9, a vehicle interior illumination structure according to a third embodiment of the present invention will be described below. In the following description, structurally and functionally the same element or component as that in the first embodiment illustrated in FIGS. 1 to 7 is defined by the same reference numeral or code, and its further description will be omitted.

FIG. 9 is a schematic perspective view showing a front interior area of an automobile, which has a vehicle interior illumination structure according to the third embodiment of the present invention. As shown in FIG. 9, an instrument panel 60 covering a lower region of the front interior area comprises an upper unit 61 having a rear region formed to expand obliquely downward in the rearward direction of the vehicle, and a lower unit 62 having a front edge formed to extend approximately along a rear edge of the upper unit 61. As with the first embodiment, a step portion S is formed along the boundary between the rear edge of the upper unit 61 and the front edge of the lower unit 62 to extend laterally so as to segment the instrument panel 10 into upper and lower portions.

A light-guiding illumination member 52 is disposed in the step portion S. Preferably, the step portion S and the illumination member 52 are provided to extend over the entire width of the instrument panel 60 while getting around a mounting portion of a shaft of a steering wheel 35.

The instrument panel 60 includes a center console unit 66 which extends from an approximately laterally central region thereof in a vertical and rearward direction of the vehicle. The center console unit 66 has a front upper region formed as an inclined portion provided with a gearshift lever 31. In the third embodiment, a plurality of manual setting dials 91 for an air-conditioning system are disposed on a rear side of the central region of the upper unit 61 of the instrument panel 60. Further, various types of manual operation buttons 92 and a display panel 99 for an audio system are disposed in a region of the instrument panel 60 on the front upper side of the manual setting dials 91.

Two conditioned-air outlet ports 93B, 93C are formed, respectively, on right and left sides of the display panel 99. Two conditioned-air outlet ports 93A, 93D are formed, respectively, in the vicinities of right and left ends of the upper unit 61 of the instrument panel 60. Various switches 46, such as a fog lamp switch, are disposed in a region of the instrument panel 60 on the lower side of the right conditioned-air outlet port 93D.

As with the first embodiment, the step portion S in the third embodiment is formed at a height approximately equal to or above that of the mounting portion of the shaft of the steering wheel 35 to the instrument panel 60. In particular, the step portion S is located above a specific position adjacent to the lower edge of the laterally right, left or central conditioned-air outlet port (a specific position below the lower edge by a given distance (e.g. 20 cm)) to provide more enhanced design.

As with the first embodiment, a front windshield glass 20 is disposed to extend upward from the vicinity of the front edge of the instrument panel 60 so as to cover an upper region of the front interior area. That is, the front edge of the instrument panel 60 is located adjacent to the lower edge of the front windshield glass 20. A pair of side window glasses 25 are disposed, respectively, at laterally opposite outer ends of the front windshield glass 20 and on the rearward side of the front windshield glass 20. A pair of door mirrors 23, 24 each serving as a side mirror for visually checking primarily the lateral rearward of the vehicle are provided, respectively, at the front ends of right and left front doors 21, 22. When a driver visually checks each of the door mirrors 23, 24 under the condition that the front doors 21, 22 are closed, he/she will view the door mirror through the side window glass 25.

The illumination member 52 disposed in the step portion S will be described in more detail below.

As mentioned above, the instrument panel 60 in the third embodiment comprises the upper unit 61 having the rear region formed to expand obliquely downward in the rearward direction of the vehicle, and the lower unit 62 having the front edge formed to extend approximately along the rear edge of the upper unit 61. The step portion S is formed along the boundary between the rear edge of the upper unit 61 and the front edge of the lower unit 62, in the same manner as that in the first embodiment. Thus, the illumination member 52 disposed in the step portion S extends to form a curved line having a laterally central portion which protrudes rearward relative to a laterally outer portion thereof. When this illumination member 52 is set in the step portion S, it may be divided into right and left portions, for example, on the basis of the laterally central portion. In this case, each of the right and left illumination members has an independent light source.

In the third embodiment, a light source 54 is disposed at an approximately laterally central portion of the illumination member 52. Thus, a luminance of light emitted from the light source 54 and guided through the inside of the illumination member 52 becomes lower as a distance from the light source is increased. That is, the illumination member 52 has a laterally outward portion with a lower luminance than that of a laterally inward portion thereof.

This makes it possible to effectively avoid an adverse affect on driving to be caused by illumination light from the laterally outward portion which obstructs the driver's view as compared to that from the laterally inward portion. According to the third embodiment, this effect can be obtained in a simplified structure where the light source 54 of the illumination member 54 is simply disposed at a laterally inward position.

As another means for allowing the illumination member 52 to have a laterally outward portion with a lower luminance than that of a laterally inward portion thereof, a glass or resin cover member covering the lower side of the illumination member 52 (see the cover member 13 in FIG. 5) may be designed to have a laterally outward portion with a lower light transmittance than that of a laterally inward portion thereof.

This means for arranging the luminance of the illumination member 52 may be effectively applied to the first and second embodiments.

In the third embodiment, when an occupant visually checks the door mirror 23 or 24 disposed at the side of a vehicle body on the laterally outer side relative to the instrument panel 60, a reflected image (virtual image) K1 or K2 of a region of the instrument panel 60 illuminated by the illumination member 52 is formed on the laterally right or left side window glass 25 in such a manner that at least a part of the reflected image overlaps the side mirror 23 or 24. Even in that case, the illumination member 52 designed to perform indirect illumination and have a laterally outward portion with a lower luminance (intensity) than that of a laterally inward portion thereof can effectively prevent the occurrence of the problem that the reflected image K1 or K2 of the target region illuminated by the illumination member 52 distinctively stands out more than the door mirror 23 or 24 when the occupant visually checks the door mirror 23 or 24, to obstruct the driver's view toward the side mirror 23 or 24.

Figure 10:
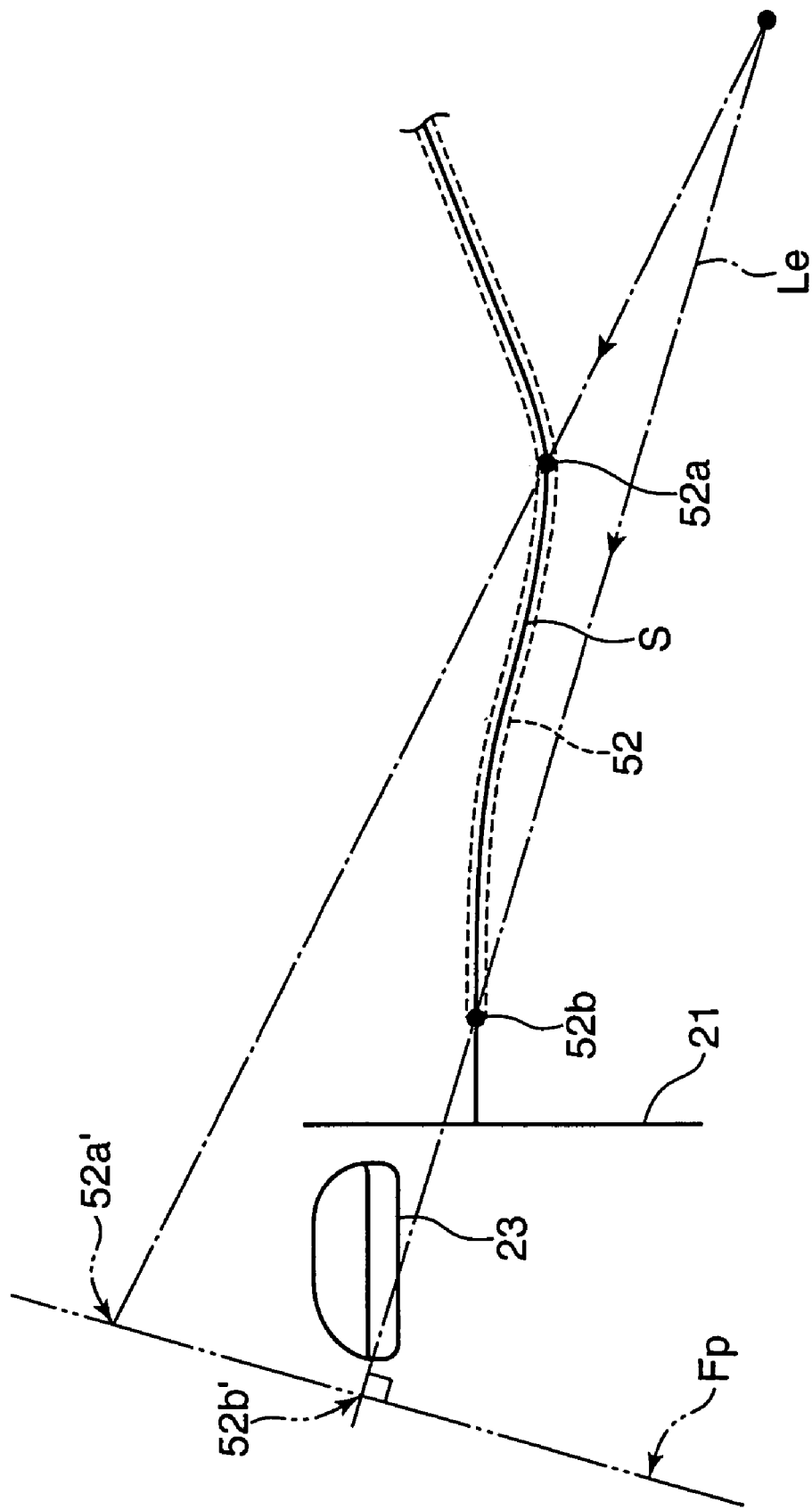
FIG. 10 is a schematic explanatory top plan view showing a positional relationship of an illumination member, a door mirror and the line of sight of a driver, in the vehicle interior illumination structure according to the third embodiment.
Figure 11:
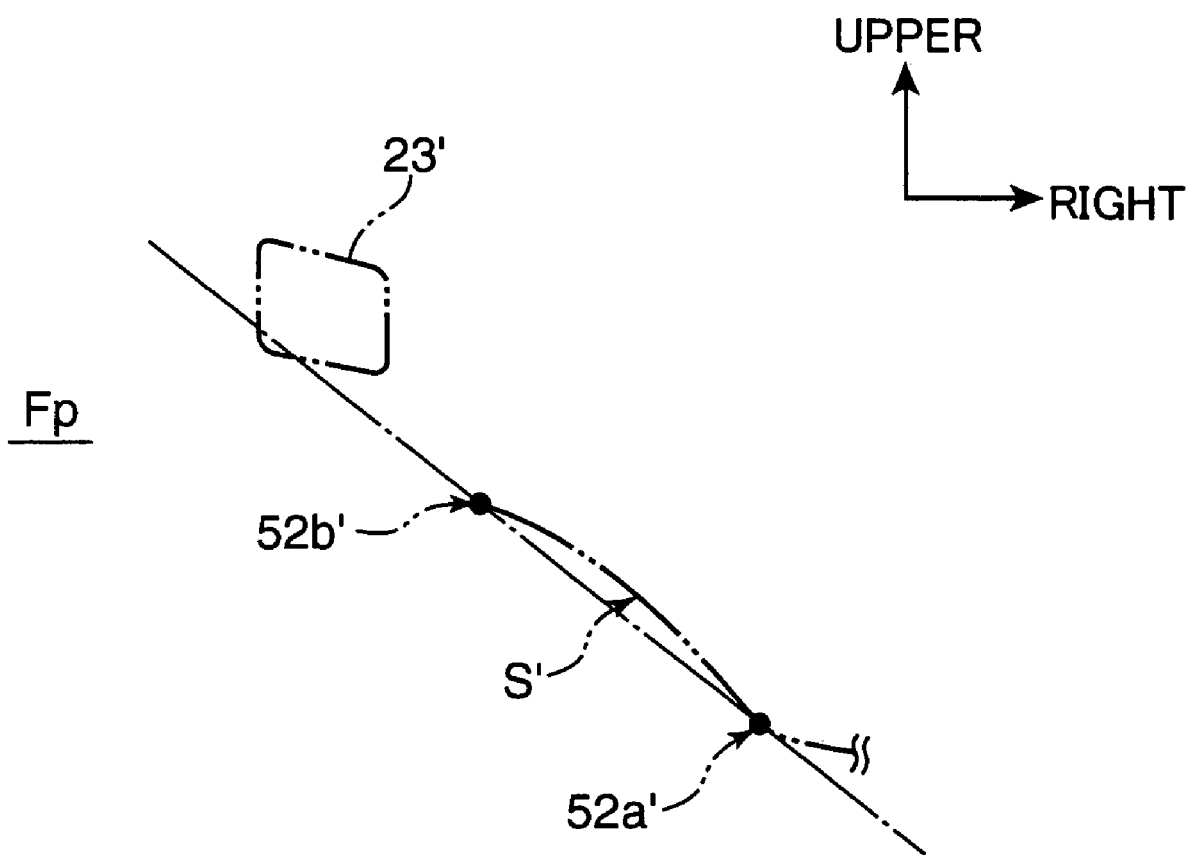
FIG. 11 is a schematic explanatory diagram showing a positional relationship of respective projections in a plane orthogonal to the line of sight of a driver viewing the laterally outer edge of the illumination member, when the driver views the lateral center and laterally outer edge of the illumination member and the side mirror in the vehicle interior illumination structure according to the third embodiment.

As shown in FIGS. 10 and 11, respective projections 52a', 52b', 23' of the lateral center 52a and laterally outer edge 52b of the illumination member 52 and the side mirror 23 which are viewed by a driver are located approximately on a straight line in a plane Fp orthogonal to the line Le of sight of the driver viewing the laterally outer edge 52*b* of the illumination member 52. Thus, when the driver visually checks the side mirror 23 on the outer side of the front passenger seat, he/she can more reliably view the side mirror 23 on an extension line of a region of the instrument panel indirectly illuminated by the illumination member 52 (i.e. in FIG. 9, the driver can move his/her line of sight from the lateral center 52*a* toward the outer edge 52*b* of the illumination member 52 to visually find the door mirror 23 on an extension line of the outer edge 52*b*). This makes it possible to facilitate checking the position of the side mirror 23.

While the illumination member in the first to third embodiments has been disposed in both the laterally right and left regions of the instrument panel, it may be disposed only in either one of the right and left regions. In this case, only the left illumination member located in opposed relation to the front passenger seat may be designed to have a luminance to be lowered in the laterally outward direction. Further, the central region of the instrument panel to be provided with a manual operation panel for an audio system may be designed to have no illumination member.

As mentioned above, the vehicle interior illumination structure of the present invention which comprises, in combination, the instrument panel installed in a front interior area of a vehicle and the light-guiding illumination member disposed in the instrument panel, makes it possible to prevent illumination light of the illumination member from obstructing the view of a driver sitting in a front seat, and prevent an upper region of the instrument panel itself or a manual operation element of an equipment disposed on the instrument panel from being reflected on a front windshield glass or side window glasses. The present invention can be effectively applied to an interior illumination system for a vehicle, such as an automobile.

In summary, the present invention provides a vehicle interior illumination structure comprising, in combination, an instrument panel installed in a front interior area of a vehicle and located on the lower side of a front windshield glass, and a light-guiding illumination member disposed in the instrument panel, wherein the front interior area is defined by the front windshield glass and opposed side window glasses on the rearward side of the front windshield glass. In this vehicle interior illumination structure, the instrument panel is formed with a step portion extending laterally at a height approximately equal to or above that of a mounting portion of a steering wheel shaft to the instrument panel. The step portion is defined in such a manner that a step upper surface located on the upper side of the step portion and a step lower surface located on the lower side of the step portion are formed in the instrument panel, and the step upper surface has a rear edge protruding in the rearward direction of the vehicle relative to a front edge of the step lower surface. Further, the illumination member is arranged to extend laterally at a position which is adjacent to the front edge of the step lower surface and capable of preventing illumination light of the illumination member from directly coming within the field of view of a driver sitting in a front seat in the vehicle interior.

As used in the specification, the term "driver" means an occupant who has an average physique of American male adults and sits in a driver's seat in a seated posture conforming to a so-called "hip point" to be uniquely set to each vehicle.

As used in the specification, the term "lateral" or "laterally" means a width direction of the vehicle.

According to the vehicle interior illumination structure of the present invention, the instrument panel is formed with the step portion extending laterally to segment at least a part of the instrument panel into upper and lower portions, wherein the step upper surface or a surface of the upper portion is arranged to have a rear edge protruding in the rearward direction of the vehicle relative to a front edge of the step lower surface or a surface of the lower portion. Further, the illumination member extends laterally at a position adjacent to the front edge of the step lower surface. Thus, when it is necessary to illuminate the interior of a vehicle, for example, during driving through a tunnel or at night, illumination light from the illumination member can adequately illuminate the instrument panel so as to allow the driver to readily recognize the position of the instrument panel without excessively lightening the front exterior region.

In this case, the illumination light of the illumination member is emitted from an inner region of the step portion, and thereby the illumination effect is primarily induced by reflected light from the step lower surface and/or a folded region of the step upper surface. This makes it possible to achieve indirect illumination and thereby eliminate the disadvantage in direct illumination, such as excessive brightness in an illuminated region and the vicinity thereof so as to create more tranquil/relaxed atmosphere in the vehicle interior. In addition, the illumination member is arranged at a position capable of preventing illumination light of the illumination member from directly coming within the field of view of the driver sitting in the front seat in the vehicle interior. This makes it possible to more effectively prevent the illumination light from obstructing the driver's view. That is, an adverse affect on driving to be caused by illumination light getting into driver's eye can be more effectively avoided.

In the vehicle interior illumination structure of the present invention, at least the step upper surface of the instrument panel may have a relatively dark tone. In this case, when the step upper surface is provided with a manual operation element, the manual operation element may have a higher degree of visibility than that of the step upper surface.

The "relatively dark tone" may include black, gray, dark blue, brown and a color tone based thereon. The "manual operation element" may include a switch, button or dial for an audio system, an air-conditioning system or an interior/exterior component/device, such as a fog lamp, and a wind-direction adjusting lever for the air-conditioning system. In order to increase the degree of visibility in the manual operation element, the manual operation element itself or its symbol mark or logo may be designed to emit light therefrom or made of a luminescent material, or may be colored, or may be increased in size.

According to this specific arrangement, at least the step upper surface of the instrument panel has a relatively dark tone. This makes it possible to prevent at least the step upper surface itself of the instrument panel from being reflected on the front windshield glass or side window glass distinctly in a light tone, for example, even during driving through a tunnel or at night, and keep the reflection from obstructing the driver's view.

In addition, the manual operation element provided on the step upper surface has a higher degree of visibility than that of the step upper surface. Thus, even though at least the step upper surface of the instrument panel has a relatively dark tone, any trouble in visually recognizing the manual operation element can be avoided. In particular, if the step upper surface of the instrument panel has a relatively dark tone to suppress the reflection of the instrument panel onto the front windshield glass or side window glass, and the vicinity of the step portion is indirectly illuminated in the above way without any measures, the driver is likely to misjudge a distance to the step upper surface when operating the manual operation element in dark circumstances, such as the nighttime, and cause driver's discomfort, for example, due to a finger-sprain-like accident. In this regard, the above manual operation element having a higher degree of visibility can prevent the occurrence of such a problem.

In the above vehicle interior illumination structure, when the step lower surface is also provided with a second manual operation element different from the first manual operation element on the step upper surface, the first manual operation element may have a lower degree of visibility than that of the second manual operation element.

According to this specific arrangement, the first manual operation element on the step upper surface has a lower degree of visibility than that of the second manual operation element on the step lower surface. Thus, while the first manual operation element on the step upper surface is liable to be reflected on the front windshield glass or side window glass as compared to the second manual operation element on the step lower surface, because the step upper surface is located closer to the front windshield glass or side window glass than the step lower surface, the reflection onto the front windshield glass or side window glass can be suppressed while avoiding the aforementioned driver's discomfort about the first manual operation element on the step upper surface.

In the vehicle interior illumination structure of the present invention, when at least the step upper surface of the instrument panel has a given dark tone, the illumination member may be designed to emit illumination light toward the step lower surface, and only the step lower surface may be provided with a manual operation element, in the vicinity of the step portion of the instrument panel.

A specific example of the "given dark tone" and the "manual operation element" may be the same as that described in connection with the aforementioned "relatively dark tone" and "manual operation element".

According to this specific arrangement, the illumination member is designed to emit illumination light toward the step lower surface, and only the step lower surface is provided with a manual operation element in the vicinity of the step portion of the instrument panel. Thus, even though the step upper surface of the instrument panel has a relatively dark tone to suppress the reflection of the step upper surface onto the front windshield glass or side window glass, the manual operation element can be illuminated by the illumination light from the illumination member, so as to allow the driver to recognize the manual operation element without any problem.

In the vehicle interior illumination structure of the present invention, when at least the step upper surface of the instrument panel has a given dark tone, and the step upper surface is provided with a manual operation element, a region of the step upper surface adjacent to the step portion may have a given ornament to allow the adjacent region to have a higher degree of visibility than that of the remaining region of the step upper surface.

A specific example of the "given dark tone" and the "manual operation element" may be the same as that described in connection with the aforementioned "relatively dark tone" and "manual operation element". The "given ornament" (provided on the region adjacent to the step portion) may include a line-shaped decorative sheet or label attached on the adjacent region.

According to this specific arrangement, even though the step upper surface of the instrument panel has a relatively dark tone to suppress the reflection of the step upper surface onto the front windshield glass or side window glass, the given ornament provided on the region of the step upper surface adjacent to the step portion allows the adjacent region to have an increased degree of visibility. Thus, the driver can recognize the step upper surface without any problem. In particular, if the step upper surface of the instrument panel has a relatively dark tone, and the vicinity of the step portion is indirectly illuminated in the above way without any measures, the driver is likely to misjudge a distance to the step upper surface when operating the manual operation element, and cause driver's discomfort, for example, due to a finger-sprain-like accident. In this regard, the given ornament provided on the region of the step upper surface adjacent to the step portion can increase the visibility of the manual operation element to prevent the occurrence of such a problem.

In the above vehicle interior illumination structure having the manual operation element with a higher degree of visibility than that of the step upper surface, or the given ornament provided on the region of the step upper surface adjacent to the step portion, the step upper and lower surfaces may have inclined zones, respectively, in the vicinity of the step portion. Each of the inclined zones may have an upper region located on the front side relative to a lower region thereof, and a different angle of inclination.

Generally, if each of the inclined zones of the step upper and lower surfaces has a different angle of inclination, the driver is apt to have difficulty in recognizing a distance to the step upper portion. Even in this case, the manual operation element with a higher degree of visibility or the given ornament can suppress the occurrence of a problem about driver's discomfort, for example, due to a finger-sprain-like accident.

In the vehicle interior illumination structure of the present invention, the illumination member may be disposed in a portion of the instrument panel located in opposed relation to a front passenger seat, and the vehicle may have a side mirror disposed at the side of a vehicle body on the laterally outer side relative to the instrument panel.

Even through the side mirror is disposed at the side of the vehicle body on the outer side of the front passenger seat, the illumination member arranged at a position capable of preventing illumination light of the illumination member from directly coming within the field of view of the driver sitting in the front seat in the vehicle interior makes it possible to more effectively prevent the illumination light from obstructing the driver's view when the driver visually checks the side mirror. Specifically, if the side mirror is disposed at the side of the vehicle body on the outer side of the front passenger seat, and the illumination member is designed to directly illuminate a target region of the instrument panel, the target region illuminated by the illumination member will distinctively stand out more than the side mirror when the driver visually checks the side mirror, resulting in insufficient backward checking using the side mirror. In contrast, the vehicle interior illumination structure performing indirect illumination as in the present invention can prevent illumination light from directly coming within the driver's field of view, and thereby an adverse affect on driving to be caused by illumination light obstructing the driver's view can be more effectively avoided.

In the vehicle interior illumination structure of the present invention, the instrument panel may be provided with an equipment element disposed adjacent to the step portion. The equipment element may be designed to be illuminated by the illumination member.

As used in the specification, the term "equipment element" means a concept encompassing the aforementioned "manual operation element", and may include: an indicator or display and a manual operation member (buttons, dials, switches, etc.) for an audio system, an air-conditioning system or an in-vehicle electric or electronic component; and vehicle equipment, such as a cup holder, a change box and a glove box which are provided in or integrated with the instrument panel; and a manual operation member of the vehicle equipment.

According to this specific arrangement, the equipment element disposed adjacent to the step portion of the instrument panel is designed to be illuminated by the illumination member. This can increase the visibility of the equipment element.

In this vehicle interior illumination structure, when the equipment element disposed adjacent to the step portion is a lower manual operation element having a convex portion protruding from the step lower surface toward the vehicle interior, the vehicle interior illumination structure may be designed to allow at least the convex portion of the lower manual operation element to be hidden by the step upper surface when the driver sitting in the front seat visually recognizes the lower manual operation element reflected on the front windshield glass.

The "lower manual operation element" having the "convex portion" may include a manual operation member, such as buttons, dials and switches.

According to this specific arrangement, when the equipment element is a lower manual operation element having a convex portion protruding from the step lower surface toward the vehicle interior, the lower manual operation element can be effectively illuminated. In addition, when the driver sitting in the front seat visually recognizes the lower manual operation element reflected on the front windshield glass, at least the convex portion of the lower manual operation element is hidden by the step upper surface. This makes it possible to prevent at least the convex portion of the lower manual operation element illuminated by the illumination member from being reflected on the front windshield glass or side window glass distinctly in a light tone, for example, even during driving through a tunnel or at night, and keep the reflection from obstructing the driver's view.

Otherwise, when the equipment element disposed adjacent to the step portion is a lower manual operation element disposed on the step lower surface, the step lower surface may include an inclined zone which extends obliquely downward from the front edge thereof in the rearward direction and has the lower manual operation element disposed thereon, and the lower manual operation element may have a lighter tone than that of the step upper surface.

A specific example of the "lower manual operation element" may be the same as that described in connection with the aforementioned "lower manual operation element".

According to this specific arrangement, the lower manual operation element has a lighter tone than that of the step upper surface. Thus, when the equipment element is a lower manual operation element disposed on the step lower surface, and the lower manual operation element is disposed on the inclined zone of the step lower surface extending obliquely downward from the front edge thereof in the rearward direction to provide enhanced operationality, the lower manual operation element is allowed to stand out against the indirect illumination with enhanced visibility. This structure also has an advantage of being able to obscure dusts attached on the lower manual operation element.

In the above vehicle interior illumination structure, when the instrument panel is formed with an upper pocket which is located above the step portion and concavedly curved in the frontward direction of the vehicle, the upper pocket may have a lower surface partly formed as a light-transmittable portion for transmitting illumination light from the illumination member therethrough.

According to this specific arrangement, the upper pocket located above the step portion of the instrument panel and concavedly curved in the frontward direction of the vehicle has a lower surface partly formed as a light-transmittable portion for transmitting illumination light from the illumination member therethrough. This allows illumination light from the illumination member to be transmitted to an inner space of the upper pocket through the light-transmittable portion, and effectively used for illuminating the inner space. Thus, user-friendliness in using the upper pocket can be enhanced without providing an additional illumination member.

Otherwise, when the instrument panel is formed with a lower pocket which is located below the step portion and concavedly curved in the frontward direction of the vehicle, the lower pocket may be designed to be illuminated by illumination light from the illumination member.

According to this specific arrangement, the lower pocket located below the step portion of the instrument panel and concavedly curved in the frontward direction of the vehicle is designed to be illuminated by illumination light from the illumination member. Thus, illumination light from the illumination member can be effectively used for illuminating the lower pocket, so that user-friendliness in using the lower pocket can be enhanced without providing an additional illumination member.

When the instrument panel further includes a lid portion for covering the upper or lower pocket in an openable and closable manner, the vehicle interior illumination structure may be designed to increase an intensity of illumination light from the illumination member in an open position of the lid portion as compared to that in a closed position of the lid portion.

According to this specific arrangement, the vehicle interior illumination structure is designed to increase an intensity of illumination light from the illumination member in an open position of the lid portion as compared to that in a closed position of the lid portion. Thus, when the lid portion is in the open position where it is necessary to illuminate an inner space of the pocket, the inner space can be more sufficiently illuminated. When the lid portion is in the closed position where it is unnecessary to illuminate the inner space of the pocket, the illumination light is adjusted to have a relatively low intensity so as to more effectively prevent the illumination light from obstructing the view of the driver sitting in the front seat. That is, an adverse affect on driving to be caused by illumination light getting into driver's eye can be more effectively avoided.

The above vehicle interior illumination structure where the vehicle has the side mirror disposed at the side of a vehicle body on the laterally outer side relative to the instrument panel may be designed such that respective projections of the lateral center and laterally outer edge of the illumination member and the side mirror which are viewed by an occupant sitting in a driver's seat (i.e. driver) are located approximately on a straight line in a plane orthogonal to the line of sight of the occupant viewing the laterally outer edge of the illumination member. As with the term "driver" in the vehicle interior illumination structure of the present invention, the "occupant sitting in a driver's seat (i.e. driver)" means an occupant who has an average physique of American male adults and sits in a driver's seat in a seated posture conforming to a so-called "hip point" to be uniquely set to each vehicle.

According to this specific arrangement, respective projections of the lateral center and laterally outer edge of the illumination member and the side mirror which are viewed by the driver are located approximately on a straight line in the plane orthogonal to the line of sight of the driver viewing the lateral outer edge of the illumination member. Thus, when the driver visually checks the side mirror on the outer side of the front passenger seat, he/she can more reliably view the side mirror on an extension line of a region of the instrument panel indirectly illuminated by the illumination member (i.e. the driver can move his/her line of sight from the lateral center toward the outer edge of the illumination member to visually find the door mirror on an extension line of the outer edge). This makes it possible to facilitate checking the position of the side mirror.

In this vehicle interior illumination structure, the illumination member may have a laterally outward portion with a lower luminance than that of a laterally inward portion thereof.

According to this specific arrangement, the laterally outward portion of the illumination member has a lower luminance than that of the laterally inward portion thereof. This makes it possible to more effectively avoid an adverse affect on driving to be caused by illumination light from the laterally outward portion which obstructs the driver's view as compared to that from the laterally inward portion.

The above vehicle interior illumination structure where the vehicle has the side mirror disposed at the side of a vehicle body on the laterally outer side relative to the instrument panel may be designed to allow a reflected image of a region of the instrument panel illuminated by the illumination member to be formed on the side window glass in such a manner that at least a part of the reflected image overlaps the side mirror.

According to this specific arrangement, even through a reflected image of a region of the instrument panel illuminated by the illumination member is formed on the side window glass in such a manner that at least a part of the reflected image overlaps the side mirror, the illumination member designed to perform indirect illumination can effectively prevent the occurrence of the problem that a target region illuminated by the illumination member distinctively stands out more than the side mirror when the driver visually checks the side mirror, to obstruct the driver's view toward the side mirror.

As mentioned above, the vehicle interior illumination structure of the present invention which comprises, in combination, the instrument panel installed in a front interior area of a vehicle and the light-guiding illumination member disposed in the instrument panel, makes it possible to prevent illumination light of the illumination member from obstructing the view of a driver sitting in a front seat in the vehicle interior.

This application is based on Japanese Patent Application Serial Nos. 2004-235930, 2004-235931, and 2005-162751, filed on Aug. 13, 2004, Aug. 13, 2004, and Jun. 2, 2005, respectively, the contents of which are hereby incorporated by reference.

Although the present invention has been fully described by way of example with reference to the accompanying drawings, it is to be understood that various changes and modifications will be apparent to those skilled in the art. Therefore, unless otherwise, such changes and modifications depart from the scope of the present invention hereinafter defined, they should be considered as being included therein.

What is claimed is:

1. A vehicle interior illumination structure comprising, in combination, an instrument panel installed in a front interior area of a vehicle and located on the lower side of a front windshield glass, and a light-guiding illumination member disposed in said instrument panel, said front interior area being defined by the front windshield glass and opposed side window glasses on the rearward side of the front windshield glass, wherein:

said instrument panel is formed with a step portion extending laterally at a height approximately equal to or above that of a mounting portion of a steering wheel shaft to said instrument panel, said step portion being defined in such a manner that a step upper surface located on the upper side of said step portion and a step lower surface located on the lower side of said step portion are formed in said instrument panel, and said step upper surface has a rear edge protruding in the rearward direction of the vehicle relative to a front edge of said step lower surface;

said illumination member is arranged to extend laterally at a position which is adjacent to the front edge of said step lower surface and capable of preventing illumination light of said illumination member from directly coming within the field of view of a driver sitting in a front seat in the vehicle interior; and said instrument panel is provided with a lower manual operation element disposed adjacent to said step portion having a convex portion protruding from said step lower surface toward the vehicle interior, wherein said vehicle interior illumination structure is designed to allow at least said convex portion of said lower manual operation element to be hidden by said step upper surface when the driver is sitting in said front seat visually recognizes said lower manual operation element reflected on said front windshield glass.

2. A vehicle interior illumination structure comprising, in combination, an instrument panel installed in a front interior area of a vehicle and located on the lower side of a front windshield glass, and a light-guiding illumination member disposed in said instrument panel, said front interior area being defined by the front windshield glass and opposed side window glasses on the rearward side of the front windshield glass, wherein:

said instrument panel is formed with a step portion extending laterally at a height approximately equal to or above that of a mounting portion of a steering wheel shaft to said instrument panel, said step portion being defined in such a manner that a step upper surface located on the upper side of said step portion and a step lower surface located on the lower side of said step portion are formed in said instrument panel, and said step upper surface has a rear edge protruding in the rearward direction of the vehicle relative to a front edge of said step lower surface; and said illumination member is arranged to extend laterally at a position which is adjacent to the front edge of said step lower surface and capable of preventing illumination light of said illumination member from directly coming within the field of view of a driver sitting in a front seat in the vehicle interior;

wherein said instrument panel is provided with an equipment element disposed adjacent to said step portion, said equipment element being designed to be illuminated by said illumination member; and wherein said equipment element disposed adjacent to said step portion is a lower manual operation element disposed on said step lower surface, wherein said step lower surface includes an inclined zone which extends obliquely downward from the front edge thereof in the rearward direction and has said lower manual operation element disposed thereon, and said lower manual operation element has a lighter tone than that of said step upper surface.

3. A vehicle interior illumination structure comprising, in combination, an instrument panel installed in a front interior area of a vehicle and located on the lower side of a front windshield glass, and a light-guiding illumination member disposed in said instrument panel, said front interior area being defined by the front windshield glass and opposed side window glasses on the rearward side of the front windshield glass, wherein:

said instrument panel is formed with a step portion extending laterally at a height approximately equal to or above that of a mounting portion of a steering wheel shaft to said instrument panel, said step portion being defined in such a manner that a step upper surface located on the upper side of said step portion and a step lower surface located on the lower side of said step portion are formed in said instrument panel, and said step upper surface has a rear edge protruding in the rearward direction of the vehicle relative to a front edge of said step lower surface;

said illumination member is arranged to extend laterally at a position which is adjacent to the front edge of said step lower surface and capable of preventing illumination light of said illumination member from directly coming within the field of view of a driver sitting in a front seat in the vehicle interior;

said illumination member being disposed in a portion of said instrument panel located in opposed relation to a front passenger seat, and said vehicle has a side mirror disposed at the side of a vehicle body on the laterally outer side relative to said instrument panel and a side window glass disposed laterally outward of the lateral edge of the instrument panel and laterally inward of said side mirror such that respective projections of the lateral center and laterally outer edge of said illumination member and said side mirror which are viewed by an occupant sitting in a driver's seat are located approximately on a straight line in a plane orthogonal to the line of sight of said occupant viewing the laterally outer edge of said illumination member; and said illumination member has a laterally outward portion with a lower luminance than that of a laterally inward portion thereof.

4. The vehicle interior illumination structure as defined in claim 3, wherein a side mirror is provided at a position laterally outward of the lateral edge of the instrument panel and is designed to allow a reflected image of a region of said instrument panel illuminated by said illumination member to be formed on a side window glass in such a manner that at least a part of said reflected image overlaps said side mirror.

5. A vehicle interior illumination structure comprising, in combination, an instrument panel installed in a front interior area of a vehicle and located on the lower side of a front windshield glass, and a light-guiding illumination member disposed in said instrument panel, said front interior area being defined by the front windshield glass and opposed side window glasses on the rearward side of the front windshield glass, wherein:

said instrument panel is formed with a step portion extending laterally at a height approximately equal to or above that of a mounting portion of a steering wheel shaft to said instrument panel, said step portion being defined in such a manner that a step upper surface located on the upper side of said step portion and a step lower surface located on the lower side of said step portion are formed in said instrument panel, and said step upper surface has a rear edge protruding in the rearward direction of the vehicle relative to a front edge of said step lower surface; and said illumination member is arranged to extend laterally at a position which is adjacent to the front edge of said step lower surface and capable of preventing illumination light of said illumination member from directly coming within the field of view of a driver sitting in a front seat in the vehicle interior wherein at least said step upper surface of said instrument panel has a relatively dark tone, and said step upper surface is provided with a manual operation element positioned on said step upper surface adjacent to and above said rear edge of said step upper surface, wherein said manual operation element has a higher degree of visibility than that of said step upper surface;

said step upper and lower surfaces have inclined zones, respectively, in the vicinity of said step portion, each of said inclined zones having an upper region located on the front side relative to a lower region thereof, each of said inclined zones having a different angle of inclination; and said step upper surface adjacent to and above said rear edge of said step upper surface where there is no manual operation element being provided above said rear edge is provided with a given ornament to allow said adjacent region to have a higher degree of visibility than that of the remaining region of said step upper surface.

6. A vehicle interior illumination structure comprising, in combination, an instrument panel installed in a front interior area of a vehicle and located on the lower side of a front windshield glass, and a light-guiding illumination member disposed in said instrument panel, said front interior area being defined by the front windshield glass and opposed side window glasses on the rearward side of the front windshield glass, wherein:

said instrument panel is formed with a step portion extending laterally at a height approximately equal to or above that of a mounting portion of a steering wheel shaft to said instrument panel, said step portion being defined in such a manner that a step upper surface located on the upper side of said step portion and a step lower surface located on the lower side of said step portion are formed in said instrument panel, and said step upper surface has a rear edge protruding in the rearward direction of the vehicle relative to a front edge of said step lower surface; and said illumination member is arranged to extend laterally at a position which is adjacent to the front edge of said step lower surface and disposed in a portion of said instrument panel located in opposed relation to a front passenger seat, and said vehicle has a side mirror disposed at the side of a vehicle body on the laterally outer side relative to said instrument panel and includes a laterally outward portion with a lower luminance than that of a laterally inward portion thereof and is capable of preventing illumination light of said illumination member from directly coming within the field of view of a driver sitting in a front seat in the vehicle interior.

7. A vehicle interior illumination structure comprising, in combination, an instrument panel installed in a front interior area of a vehicle and located on the lower side of a front windshield glass, and a light-guiding illumination member disposed in said instrument panel, said front interior area being defined by the front windshield glass and opposed side window glasses on the rearward side of the front windshield glass, wherein:

said instrument panel is formed with a step portion extending laterally at a height approximately equal to or above that of a mounting portion of a steering wheel shaft to said instrument panel, said step portion being defined in such a manner that a step upper surface located on the upper side of said step portion and a step lower surface located on the lower side of said step portion are formed in said instrument panel, and said step upper surface has a rear edge protruding in the rearward direction of the vehicle relative to a front edge of said step lower surface;

said illumination member is arranged to extend laterally at a position which is adjacent to the front edge of said step lower surface and capable of preventing illumination light of said illumination member from directly coming within the field of view of a driver sitting in a front seat in the vehicle interior; and said illumination member is disposed in a portion of said instrument panel located in opposed relation to a front passenger seat, and said vehicle has a side minor disposed at the side of a vehicle body on the laterally outer side relative to said instrument panel and a side window glass disposed laterally outward of the lateral edge of the instrument panel and laterally inwardly from said side mirror such that a reflected image of a region of said instrument panel illuminated by said illumination member formed on said side window glass at least partially overlaps said side mirror.

* * * * *